United States Patent
Kumar

(10) Patent No.: US 7,206,647 B2
(45) Date of Patent: Apr. 17, 2007

(54) E-APPLIANCE FOR MOBILE ONLINE RETAILING

(75) Inventor: Alok Kumar, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 861 days.

(21) Appl. No.: 10/102,037

(22) Filed: Mar. 21, 2002

(65) Prior Publication Data

US 2003/0182195 A1 Sep. 25, 2003

(51) Int. Cl.
*G05B 15/00* (2006.01)
*G06F 1/16* (2006.01)

(52) U.S. Cl. .................. 700/83; 235/383; 361/686; 713/100

(58) Field of Classification Search .......... 455/3.01; 235/379, 383, 380; 361/681, 686; 700/9, 700/83; 713/100
See application file for complete search history.

(56) References Cited

U.S. PATENT DOCUMENTS 4,734,858 A 3/1988 Schlafly (Continued)

FOREIGN PATENT DOCUMENTS

EP 1136961 A 9/2001

(Continued)

OTHER PUBLICATIONS

Bharat Rao; "Advances in Online Retailing: Towards the Convergence of the Internet, Wireless, and Broadband"; IEEE; Aug. 13, 2000; pp. 602-606.

(Continued)

*Primary Examiner*—Andrew Joseph Rudy
(74) *Attorney, Agent, or Firm*—Maginot, Moore & Beck LLP

(57) ABSTRACT

A portable device used for online retailing comprises a screen that is divided into numerous section for displaying different information. The bottom section of the screen includes navigation buttons. The top section includes promotions. The central section displays online catalog information. The device is also provided with wireless capability to connect to the Internet. All sections on the screen are activated through a touch screen. The device incorporates shopping, authentication, security and payment capabilities so that the user may have a seamless shopping experience.

14 Claims, 5 Drawing Sheets

U.S. PATENT DOCUMENTS

| | | |
|---|---|---|
| 5,664,110 A | 9/1997 | Green et al. |
| 5,864,823 A | 1/1999 | Levitan |
| 5,884,281 A * | 3/1999 | Smith et al. .................. 705/26 |
| 5,890,137 A | 3/1999 | Koreeda |
| 5,905,973 A | 5/1999 | Yonezawa et al. |
| 5,909,023 A | 6/1999 | Ono et al. |
| 5,937,391 A | 8/1999 | Ikeda et al. |
| 5,946,665 A | 8/1999 | Suzuki et al. |
| 5,971,237 A | 10/1999 | Timbrook .................... 223/85 |
| 5,979,757 A | 11/1999 | Tracy et al. |
| 5,983,200 A | 11/1999 | Slotznick |
| 5,999,914 A | 12/1999 | Blinn et al. |
| 6,009,410 A | 12/1999 | LeMole et al. |
| 6,026,376 A | 2/2000 | Kenney |
| 6,058,417 A | 5/2000 | Hess et al. |
| 6,064,981 A | 5/2000 | Barni et al. |
| 6,068,183 A | 5/2000 | Freeman et al. |
| 6,070,148 A | 5/2000 | Mori et al. |
| 6,072,493 A | 6/2000 | Driskell et al. |
| 6,078,928 A | 6/2000 | Schnase et al. |
| 6,081,830 A | 6/2000 | Schindler |
| 6,246,862 B1 * | 6/2001 | Grivas et al. ................ 455/566 |
| 6,435,406 B1 * | 8/2002 | Pentel ........................ 235/380 |
| 6,507,762 B1 * | 1/2003 | Amro et al. ................... 700/83 |
| 6,587,835 B1 * | 7/2003 | Treyz et al. ................... 705/14 |
| 6,646,873 B2 * | 11/2003 | Chu-Chia et al. ............ 361/686 |
| 6,837,436 B2 * | 1/2005 | Swartz et al. ........... 235/472.02 |

FOREIGN PATENT DOCUMENTS

WO    WO 01/027837 A2    4/2001

OTHER PUBLICATIONS

Patent Abstracts of Japan; JP 2002 123698; vol. 2002, No. 08; Aug. 5, 2002.

\* cited by examiner

E-APPLIANCE FOR MOBILE ONLINE RETAILING

FIELD OF THE INVENTION

The present invention relates generally to the use of a portable device in online environment, and more particularly, to a portable e-appliance that is configured to be used for a very specific purpose such as online shopping.

BACKGROUND OF THE INVENTION

Currently, the most common online retailing process involves using a desktop/laptop computer to log on to the Internet, navigate to a web site using a browser, browse through the catalog, make selection, and place an order. This process is most suitable for home or office environments but is impossible, as in the case of desktop computers, or not very convenient, as in the case of laptop computers, when the user is traveling or in a public location. Fully functional computer systems i.e. desktop/laptop computers are also bulky, expensive, and include too many options or features which are not necessary for a very specific purpose such as online shopping.

Thus, there is a need for a method and apparatus which provide users with greater portability and convenience making purchases on the Internet, using preexisting, low cost, commercially available handheld devices.

SUMMARY OF THE INVENTION

It is, therefore, an object of the present invention to provide in integrated portable platform that incorporates shopping, authentication, security and payment capabilities so that the user may have a seamless shopping experience.

It is a further object of the present invention to allow a user to use a low cost handheld device for a very specific purpose such as online shopping instead of a multi-purpose fully functional computer system.

It is another object of the present invention to take advantage of compactness, absolute portability and touch capability inherent in the commercially available handheld devices in online retailing.

These and other objects of the present invention are achieved by A method of using a portable device in online retailing. In accordance with the method, a connection is established between the portable device and a dedicated server. A request is sent from the portable device to the dedicated server. The dedicated server will identify a type of the portable device upon receiving the request and transfer to the portable device a plurality of items corresponding to the determined type of the portable device for selection by a user of the portable device. A transaction is then carried out based on at least one of the items selected by the user.

According to some aspects of the present invention, the items are transferred in form of a platform independent executable code, all communication takes place over a wireless trusted connection, and the user's payment information comprises preprogrammed credit card information. According to other aspects of the present invention, the portable device may be one of Internet-ready mobile phone and wireless-capable PDA and tablet computer. The portable device preferably have a display component having at least one of a screen size, a screen maximum resolution, and a screen color depth lower than a predetermined standard.

The foregoing and other objects of the present invention are also achieved by a portable device for use in online retailing. The portable device comprises a processor, a wireless port for wireless connection to a server, a display, an input component and a memory coupled to the processor. The memory has stored therein sequences of instructions, which, when executed by the processor, cause the processor to perform the steps of: a) establishing a wireless connection between the portable device and the server via the wireless port; b) sending a request containing an indication of a type of the portable device from the portable device to the dedicated server; c) receiving a plurality of items corresponding to the type of the portable device from the dedicated server; d) presenting the received items on the display component for selection by a user of the portable device; and e) placing an order with the server based on at least one of the items selected by the user using the input component.

According to an aspect of the present invention, the display component and the input component are integrated in a touch screen which displays a set of virtual navigational buttons, a main region for displaying a catalog and a promotional region for displaying promotional information. According to another aspect of the present invention, the memory comprises a plurality of non-volatile erasable programmable memory cells which are configured to be substantially instantly accessible by the processor upon power on of the portable device.

The foregoing and other objects of the present invention are further achieved by an online retailing system, comprising a server and a portable device communicable with the server via a wireless connection. The portable device comprises a user handling module for sending a request containing a type of the portable device to the server, a functionality module downloadable from the server for presenting a catalog of items to a user of the portable device, and a shopping module for carrying out a transaction with the server based on at least one of the items selected by the user. The server comprises an application handling module for receiving the request from the portable device and transferring the functionality module to the portable device based on the type of the portable device, and a transaction processing module for carrying out the transaction in conjunction with the shopping module.

According to an aspect of the present invention, the portable device further comprises a browser and the functionality module comprises an applet to be executed and displayed in the browser. According to another aspect of the present invention, the functionality module may comprise a client application of a web service which is invoked upon execution of the client application, or an installable application which is downloaded from the server and installed on the portable device only the very first time the portable device is communicated with the server.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Methods and apparatus of using a portable device in an integrated online retailing platform that incorporates shopping, security, authentication, and payment for providing a seamless shopping experience are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
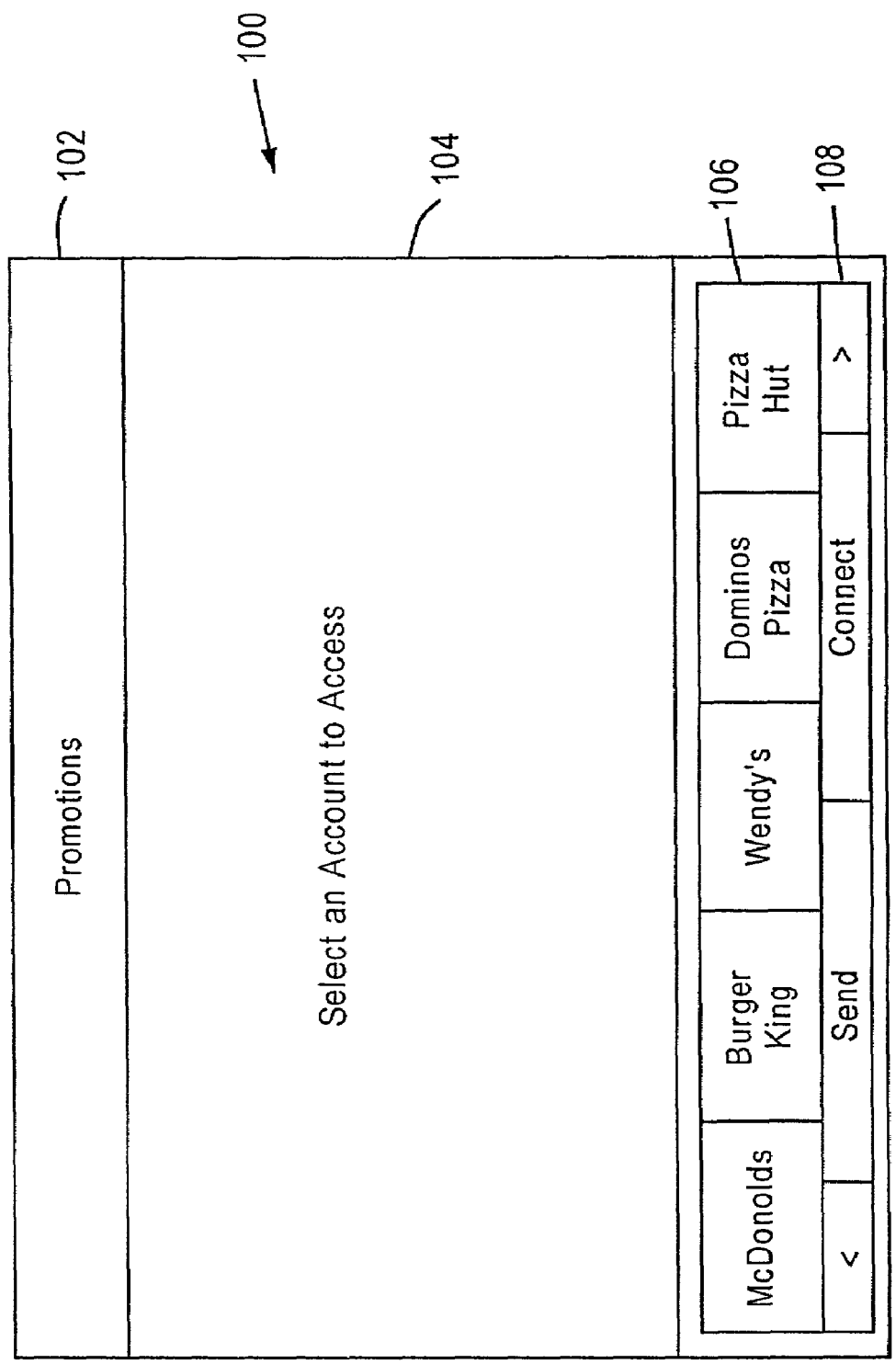
FIG. 1 is a schematic view of an exemplary screen presented on a display of a portable device in accordance with the present invention.

FIG. 1 is a block diagram showing exemplary hardware 100 upon which embodiments of the invention may be implemented. The present invention is usable with currently available portable devices such as laptop computer and PDAs (Personal Digital Assistant). The present invention may be implemented in recent models of cell phone as well.

Although the present invention can be embodied in a fully functional laptop computer, there are several drawbacks. For example, a laptop computer, even with a slim or thin configuration, is still relatively heavy, weighing approximately from three to seven pounds, and therefore bulky, especially for certain kinds of people like truck drivers or health professionals. Battery life of laptops is relatively short, and the laptops themselves are expensive. Laptops also require a certain amount of time from the start until the operating system is loaded. Laptops, therefore, do not provide a desired level of convenience for online shoppers who needs instant access to their favorite stores whenever and wherever they feel like shopping. In this aspect, laptops are inferior to PDAs.

PDAs fall into two major categories: hand-held computers and palm-sized computers. The major differences between the two are size, display and mode of data entry. Compared to palm-sized computers, hand-held computers tend to be larger and heavier. They have larger liquid crystal displays (LCD) and use a miniature keyboard, usually in combination with touch-screen technology, for data entry. Palm-sized computers are smaller and lighter. They have smaller LCDs and rely on stylus/touch-screen technology and handwriting recognition programs for data entry. An Internet ready cell phone is a regular cell phone configurable to connect to the Internet via a dedicated ISP (Internet service provider). The keypad on the cell phone may be used for navigation through web pages and/or data entry. In general, the present invention can be embodied in any off-the-shelf portable apparatus. An exemplary PDA structure is illustrated in FIG. 4.

Figure 4:
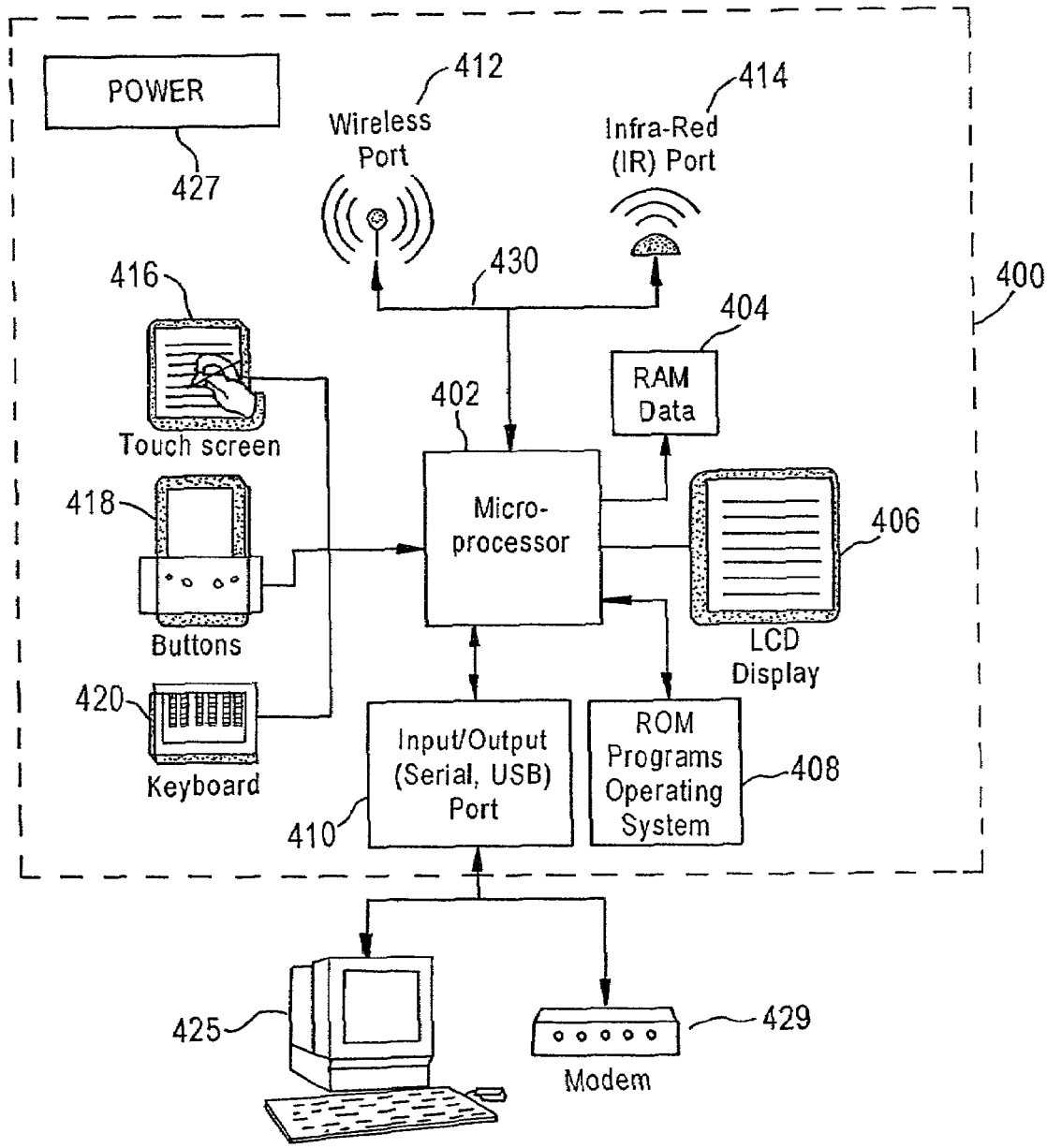
FIG. 4 is a block diagram showing exemplary hardware suitable for the device of the present invention.

In FIG. 4, hardware 400 comprises microprocessor 402, memory 404, 408, display 406, 416, and data input component 416, 418, 420. Hardware 400 also includes a network interface for connection to a special server or a distributed network such as the Internet. Preferably, the network connection is wireless to facilitate absolute portability of the device of the present invention. For this purpose, the network interface in hardware 400 comprises wireless port 412. Each of the above listed components coupled to microprocessor 402 via buses designated at 430. The device is powered by power supply 427 which includes usually one or more batteries.

Microprocessor 402 is the brain of the device and coordinates all of the device's functions according to programmed instructions. PDAs use smaller, cheaper and slower microprocessors than PC counterparts, with a speed of about 16–75 MHz, compared with 200 MHz and up in PCs. A PDA may not need a hard drive and stores basic programs including operating system in read-only memory (ROM) chip 408, which remains intact even when the machine shuts down. Memory 404 is thus a non-volatile type of memory. Data and any programs added later are stored in RAM 404. This approach has several advantages over standard PCs including laptops. When the PDA is turned on, all programs are instantly available and the user does not have to wait for applications to load. When the device is turned off, the data (and later added applications) are still safe, because the PDA continues to draw a small amount of power from the batteries. Hardware 400 may even incorporate removable forms of memory such as flash cards. The total amount of memory in a PDA is approximately from 2 to 32 MB and is upgradeable.

PDAs have some type of LCD display screen. Unlike the LCD screens for desktop or laptop computers, which are used solely as output devices, PDAs may use their screens for both output and input. The LCD screens of PDAs are of smaller sizes (about 4 inches), lower pixel resolutions (160× 160, 240×320), and lesser color depths (16 or 256 grayscale or 65,536 colors) than laptop screens. This difference in screen size and quality between PDAs and laptops significantly affects how the device of the present invention interacts with the server or the rest of the distributed network. Display 406, 416 may be passive or active matrix, reflective or backlit.

PDAs vary in how data and commands may be entered. Hand-held computers typically use miniature keyboard 420 in combination with touch screen 416. Palm-sized computers use a stylus and touch screen 416 exclusively in combination with a handwriting recognition program (not shown). Each device also has a few buttons 418 to bring up screens or applications. Another way of data entry is to use a virtual onscreen keyboard (not shown). The virtual keyboard often looks like a regular keyboard, except the user taps on the letters with the stylus. An external and optionally collapsible keyboard that plugs into the PDA is also available as an input component. Yet another way of data entry is to use voice recognition technology incorporated in the PDA, where the user speaks into a built-in microphone while software converts the user's voice waves into data. This embodiment is especially suitable when hardware 400 is a cellular phone.

A PDA needs an operating system which contains the pre-programmed instructions controlling microprocessor 402. The operating systems used by PDAs are not as complex as those used by PCs. They generally have fewer instructions and take up less memory (e.g. less than 100 K of memory). Therefore, operating systems of PDAs may not be capable of supporting all types of programming and data presentation available in the distributed network. It may be important that the server to which the PDA connects supply the device with platform independent executable codes which may run faultlessly on almost any operating systems and/or hardware infrastructure. Also called "machine independent" and "hardware independent," platform independent refers to software that runs in a variety of computers. For example, interpreted programs are platform independent, providing there are interpreters for more than one machine Additionally, a PDA may be arranged to work in tandem with a desktop or laptop 425 in which case the PDA must be able to communicate with the desktop laptop. The communication between PDA and PC is typically done through serial or USB port 410 or IR (infrared) port 414 as shown in FIG. 4. Serial or USB port 410 may serve as an interface with modem 429.

It should be noted that though the hardware structure of the present invention has been described as based on a PDA, it is within the scope of the present invention to implement the inventive device on desktops, laptops or any computer structures which have a microprocessor, a memory, a display, a data/command input component and a network interface. Inclusion of a hard drive is not excluded from the scope of the present invention.

Figure 5:
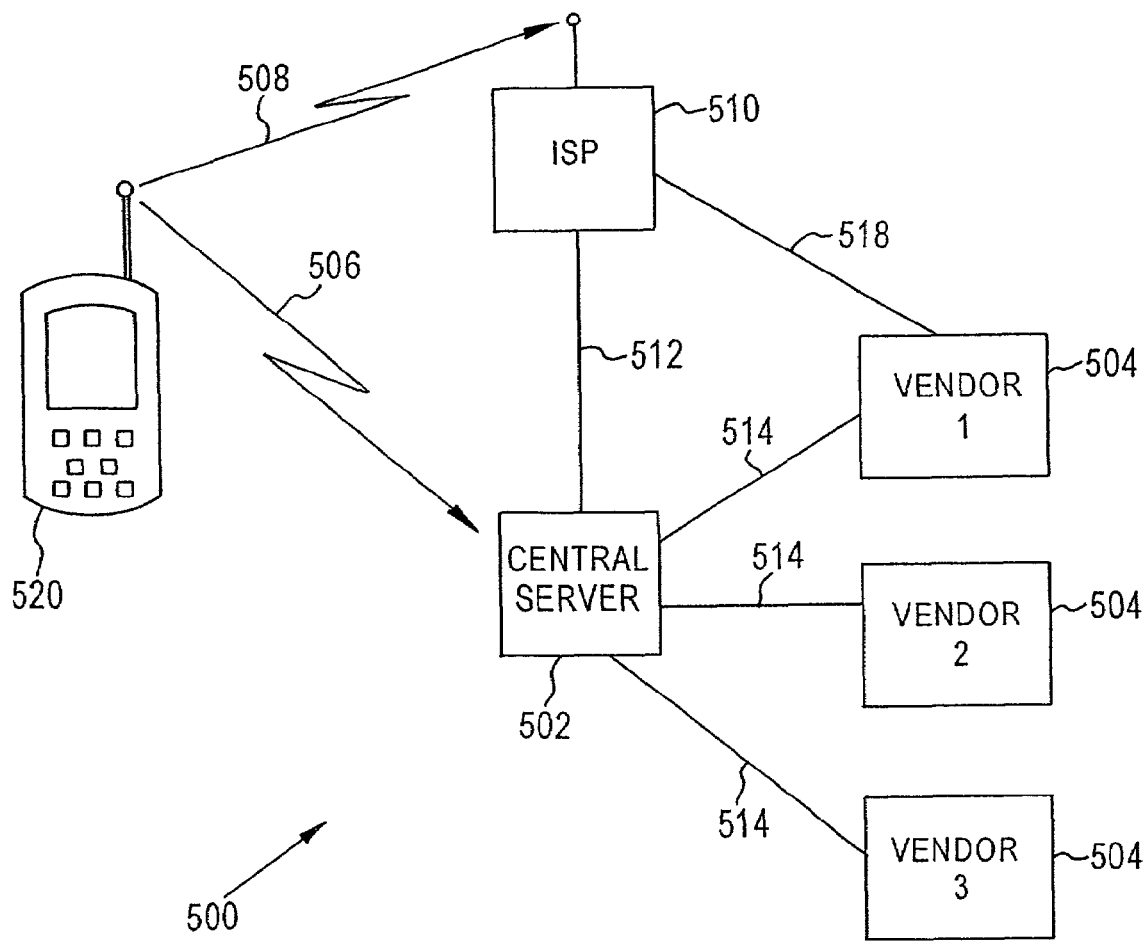
FIG. 5 is a block diagram showing physical arrangement of a system in accordance with the present invention.

Reference is now made to FIG. 5 in which a block diagram showing physical arrangement of a system in accordance with the present invention is presented. System 500 includes portable device 520 which has a physical structure suitable for the present invention as described above. For example, portable device 520 may be a PDA as illustrated in FIG. 4. The PDA still needs to be programmed in accordance with the present invention as will be described hereinafter. System 500 further includes server 502 directly communicable with portable device 520 via connection 506 which is preferably wireless. Alternatively or additionally, server 502 may be communicated with portable device 520 via ISP 510, in which case portable device 520 is logged on to ISP 510 via connection 508 and ISP 510, in turn, is communicated with server 502 via connection 512. Connection 508 is preferably wireless while connection 512 may be wired.

In an embodiment, server 502 is a central server which is communicable with a number of vendors 504 via a number of connections 514. In a network of the system in accordance with the present invention, vendors are nodes which offer products or services for sale or free of charge. For sake of simplicity, vendors 504 in the exemplary embodiment of FIG. 5 designate web sites which offer products or services for sale. Vendors 504 may be connected to portable device 520 either through central server 502, or "directly" over the Internet, i.e. via ISP 510. In the latter case, vendors 504 exchange information with portable device 520 using wireless connection 508 and wired connection 518 between vendor sites 504 and ISP 510. In another embodiment, server 502 is a vendor itself which directly communicates portable device 520 without intermediate nodes. In yet another embodiment where portable device 520 connects to the distributed network or the Internet through server 502, server 502 serves as an ISP for portable device 520. In a further embodiment, the network including portable device 520, server 502, and vendors 504 may be an isolated or specialized network in which case portable device 520 may need to communicate with both server 502 for shopping with vendors 504, and ISP 510 for using the Internet for general purposes.

Figure 2:
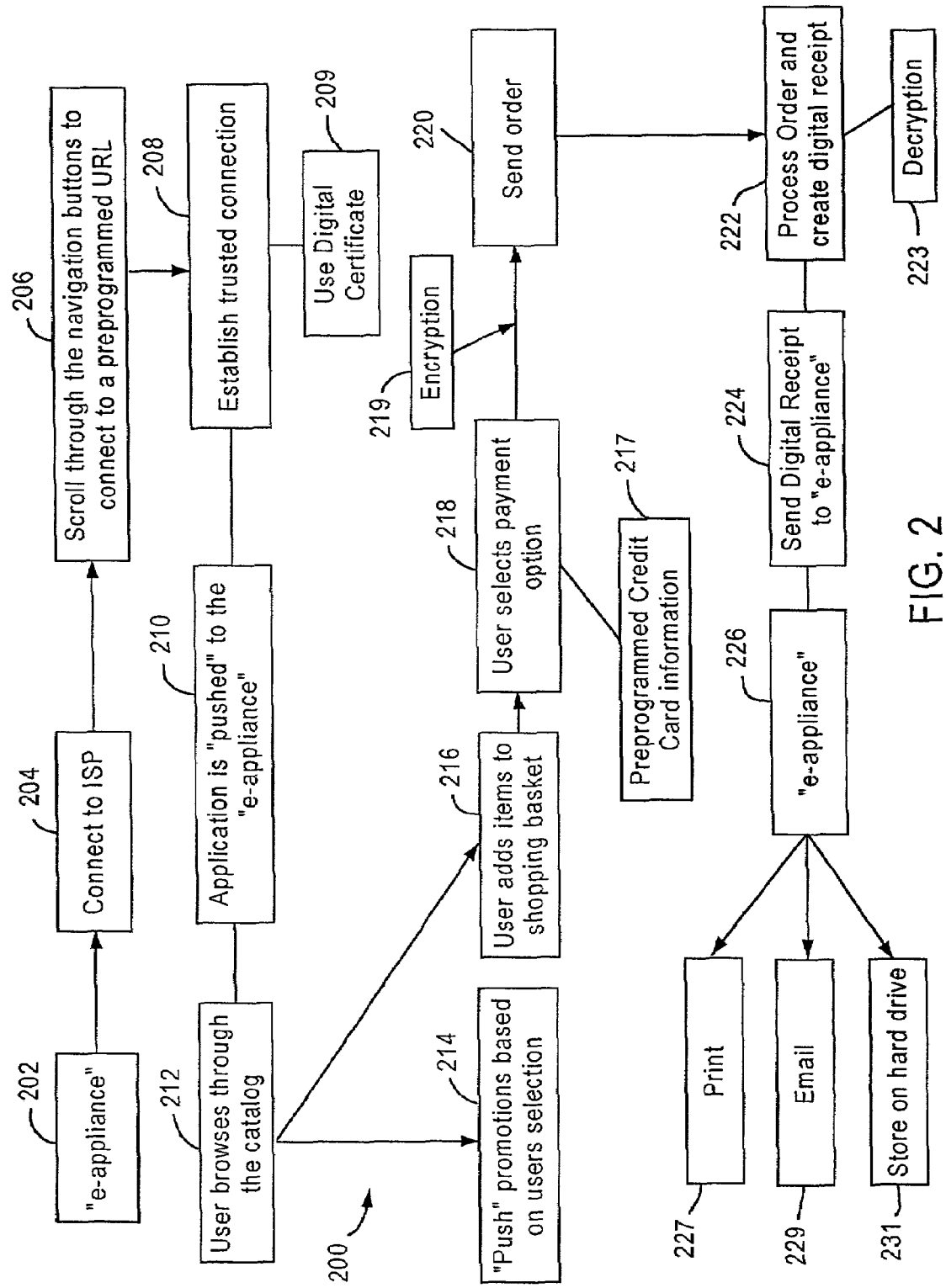
FIG. 2 is a flow chart showing a method of using a portable device in online retailing in accordance with the present invention.

Reference is now made to FIG. 2 in which a flow chart showing a method of using a portable device in online retailing in accordance with the present invention is presented. The method comprises the step of providing a portable device or "e-appliance" at 202. The portable device has a physical structure suitable for the present invention as described above. For example, the portable device may be a PDA as illustrated in FIG. 4. In an embodiment of the present invention, the portable device may be any off-the-shelf apparatus commercially available. The portable device, e.g. 520 in FIG. 5, is then connected to ISP 510 at 204. Using connection 508 to the distributed network or Internet, portable device 520 contacts server 502 for the first time. As has been described before, portable device 520 may directly contact server 502 without intermediate ISP 510.

When portable device 520 is connected to server 502 for the first time, server 502 provides (not shown) portable device 520 with a list of vendors for selection by a user of portable device 520. The user then chooses a number of vendors he wants to buy from the list. Server 502 sends client software which manages the chosen vendors to portable device 520. Communication and information exchange between portable device 520 and server 502 are accomplished in one or more manners described below.

In an alternative embodiment, the user may buy portable device 520 with a preinstalled vendor list and associated client software. In this case, the user may immediately begin shopping with the vendors on the list. The list is preferably editable by, for example, contacting server 502 as described above. In yet another embodiment, the user may buy portable device 520 without a preinstalled vendor list and associated client software. The user will then use a PC system to contact server 502 or a dedicated server to download a vendor list and associated client software therefrom. The downloaded vendor list and client software will be next transferred to portable device 520 using one or more communication ports 414, 410 shown in FIG. 4.

When a number of vendors and client software associated therewith have been downloaded and/or preinstalled in portable device 520, the user may begin shopping by executing (not shown) the associated client software. This step is optional because the vendor list may be configured to be immediately displayed on the screen of portable device 520 upon power on of the device as described above. In an exemplary embodiment, the downloaded vendor list may be displayed in form of a plurality of buttons 106 (FIG. 1). Each button 106 is actually a link to a corresponding vendor site 504. If the number of downloaded vendors is too large, all vendors may not be fitted on small size screen of portable device 520. In this case, the downloaded vendor list may be arranged in a number of pages. Navigational buttons 108 are then provided on screen 100, illustrated in FIG. 1, to allow the user to switch back and forth among the pages. Navigational buttons 108 may also be used to browse through a catalog of items offered by a vendor as will be described hereinafter. It is within the scope of the present invention to display the downloaded vendor list otherwise, for example, using drop-down or expanded/collapsed lists. The vendors may be organized and grouped in a hierarchical manner as generally known in the art. The pages of the vendor list may also be organized hierarchically, except for the first page of a first few pages where featured or favorite vendors are presented to provide the user with a quick access to his preferred stores.

The user then browses the vendor list, at 206, to find the vendor he wants to buy from. When the desired vendor is found, the user activates a link associated with the selected vendor by e.g. clicking on a button 106 bearing the selected vendor's name or brand name. A connection between portable device 520 and the selected vendor will then be established, at 208. This connection is preferably a trusted connection which is generally a connection that cannot be illegally accessed or tampered with. For this purpose, user digital certificate 209 may be needed. Digital certificate 209 is actually a public key of the user that has been digitally signed by a private key of a certification authority (CA). Generally, the digital certificate is sent along with a digital signature of the user to verify that the user/sender is truly the entity identifying itself in 4the transmission, and not an impersonator. It should also be noted that the trusted connection is a logical connection which may be established over one or more physical connections between portable device 520 and server 502. For example, the trusted connection may be established over physical connection 506, or over connections 508 and 512. Other messages may still be sent along the same physical connections together with messages of the trusted connection without interfering or tampering therewith.

When the trusted connection has been established, the preinstalled or downloaded client software of portable device 520 starts "talking" to server 502 requesting (not shown) a catalog of items, i.e. products or services, offered by the interested vendor. Server 502 will send the catalog in a form that is suitable to be read by the user on portable device 520. This is an essential feature of the present invention since the amount, and perhaps the quality, of display area available in portable device 520 is not as large, and as good, as e.g. in a laptop computer. In other words, it is important that server 502 knows what kind of device portable device 520 is, and hence what type of display or capability portable device 520 has, in order to send the requested information in the corrected form.

Web pages are now configured to contain a large amount of information therein. The information may also be presented in a number of formats such as text, image, audio and video. Text can be presented in virtually any types of device equipped with a display, and is relatively compact. For example, a page of text takes only about 2,000 to 4,000 bytes. Images are more bulky and often require a display of particular size and quality, such as pixel resolution and color depth. For example, an image having a size of 640×480 and a 65,536 color mode will be displayed with significant degradation in a PDA display which has a resolution of only 240×320 and is capable of displaying only 256 colors. The user will also have to scroll the screen both vertically and horizontally to see the image which is certainly inconvenient. Audio format requires that portable device 520 have specific sound and or voice capability which are built in features of e.g. cell phones. Audio files, however, require relatively large numbers of memory space which may not be always available in handheld devices. Video is the most bulky media format which requires high display and sound/voice capabilities. Video files are also much larger than images or audio files.

Therefore, it is desirable that not every single bit of a web page or a catalog be transmitted to portable device 520. The web page or catalog may be trimmed before being sent out to portable device 520 in any manners known in the art. The trimmed version of the web page or catalog preferably contains only essential information such as product serial number, brief description of product, and price. The trimmed version of the web page or catalog preferably contains only media formats which is suitable for the particular type of portable device 520. For example, if portable device 520 is not sound/voice capable, the trimmed web page or catalog should not contain audio files. Images may be discarded completely or resized and/or resampled to be in an easier-to-display form.

The type of portable device 520, and hence the type of display or capability portable device 520 has, may be determined by server 502 in several manners. In an embodiment, the downloaded and or preinstalled client software is configured to detect the display type and displayable modes of screen 406, 416 of portable device 520. The client software includes the detected information in the request sent to server 502 thereby informing server 502 of how to trim or edit the catalog and/or what previously trimmed/edited version of the catalog may be properly displayed or presented by the particular portable device 520. The catalog of course needs not be trimmed or edited if it is already in a form suitable to be presented by portable device 520. The detected information may be stored locally in portable device 520 for subsequent transactions, or centrally in server 502 so that the client software of portable device 520 does not have to send the detected information again. In another embodiment, the downloaded or preinstalled client software provides the user with a plurality of display (or multimedia) modes he wants to use in the current session. The user chooses one of the modes and the chosen mode is reported to server 502 for appropriate action. The modes presented by the client software may include one or more recommended modes based on actual capabilities of portable device 520, and/or user favorite modes preprogrammed by the user. In yet another embodiment, a cookie containing information relating to e.g. the display capability of portable device 520 is embedded therein by server 502, in a manner known in the art. The cookie is preferably embedded during the setup process when portable device 520 contacts server 502 for the first time. Afterward, the cookie is read every time portable device 520 connects to server 502.

When an appropriate version of the catalog has been generated or chosen by server 502, the catalog is sent to portable device 520. This may be done in several ways. In a preferred embodiment, the catalog is transformed into an executable piece of code, at 210, which when being executed in portable device 520 displays the chosen version of the catalog to the user. The executable code may be an applet which is a small application, such as a utility program or limited-function spreadsheet or word processor. Advantageously, the applet is a Java applets that are run from a browser preinstalled in portable device 520. In this case, the browser needs a built in Java Virtual Machine to interpret the instructions of the Java applet. In the context of the invention, a browser is generally a program that lets the user look through a set of data such as the catalog. Advantageously, the browser of portable device 520 is a web browser that serves as the user's front end to the World Wide Web on the Internet. Examples of web browser are Netscape Navigator and Microsoft Internet Explorer. It is worthwhile noting that due to the memory constraint in portable devices, the browser should be light weighted i.e. include only essential features.

If portable device 520 does not have a browser, portable device 520 may need a stand alone Java Virtual Machine to interpret the instructions. Alternatively, the executable code may be an ActiveX control which is also run in a browser or a Win32 application. An ActiveX control is a software module based on Microsoft's Component Object Model architecture. On a distributed network such as the Internet, ActiveX controls can be linked to a Web page and downloaded by an ActiveX-compliant Web browser. ActiveX controls turn Web pages into software pages that can perform like any program that is launched from a server. A Win32 application is an application written for 32-bit Windows operating systems using the appropriate programming interface (API). When applications are written to the Win32 API, they can run in all operating systems except where there are OS-specific features that are unavailable in the others. In this case, portable device 520 needs a Win32 compliant operating system.

It should be noted that the above examples are for illustrative purpose only and do not limit the scope of the present invention. It is worthwhile noting that the executable code is preferably platform independent as has been described in the foregoing section.

In another embodiment, the catalog is transmitted in form of a trimmed or edited web page using known HTML, XML or WML technologies. HTML or HyperText Markup Language is a document format used on the World Wide Web. Web pages are built with HTML tags embedded in the text which define the page layout, fonts and graphic elements as well as the hypertext links to other documents on the Web. XML or EXtensible Markup Language is an open standard for describing data using a similar tag structure as HTML. However, whereas HTML defines how elements are displayed, XML defines what those elements contain. WML or Wireless Markup Language is a tag-based language used in the Wireless Application Protocol (WAP). WML is an XML document type allowing standard XML and HTML tools to be used to develop WML applications. Advantageously, the catalog is transmitted using the WML format. However, the use of the other two formats and any formats available in the art is not excluded and within the scope of the present invention.

Of particular note, the executable code technique described immediately above may also be used the first time portable device 520 connects server 502 to download and the client software on portable device 520. An alternative method is to invoke a web service which is a Web-based application that can dynamically interact with other Web applications using an XML message protocol. The goal is to enable one application to find another on the Internet that provides a needed service and to seamlessly exchange data with it. Yet another method is to download and install installable client software on portable device 520. The last method is, however, most appropriate for fully functional computer systems such as desktops or laptops, although it can also be used with handheld device.

Returning to FIGS. 1 and 2, the executable code is executed or the HTML/XML/WML pages are displayed by a browser of portable device 520 to present to the user the catalog or a trimmed edited version thereof. The catalog is preferably displayed in main region 104 of screen 100 illustrated in FIG. 1. The user then browses the received catalog, at 212, using virtual navigational buttons 108 and/or keypad 420 and/or physical button 418. The user adds items he wants to a virtual shopping basket, at 216. When the user is ready for checkout, he selects a payment option, at 218, and places an order, at 220. The order is sent to server 502 which processes the order, at 222, based on the user's selected items and payment option. Server 502 also creates a digital receipt to be sent back to portable device 520, at 226. The receipt can be locally stored, at 231, in memory 404 or a hard drive, if available, of portable device 520. The receipt can be emailed at 229 if portable device 520 is email-capable. The user may also print the receipt at 227.

To enhance security, portable device 520 may be set up so that the order or at least one part thereof which contains the user's selected payment information is encrypted, at 219. The encrypted order is then decrypted by server 502 at 223 before processing at 222. In addition, all communication, except the initial connection to ISP 510, of portable device 520 should take place over a trusted connection.

Advantageously, the payment options presented to the user at check out comprises preprogrammed credit card information. In this way, the user does not have to repeatedly enter the credit card information every time a purchase is made. This is especially convenient when the user places an order from a public location or transportation. The payment options may include information of more than one credit cards which is editable and/or downloadable from e.g. the user's PC system.

Advantageously, every time the user browses for an item, the click stream information is captured, preferably by the client software, and sent back to server 502. Click stream information related to the trail of mouse clicks, or taps on touch screen 416, or navigational key presses, made by a user performing a particular operation on the computer. In the context of the present invention, click stream information includes linking from one page to another on the World Wide Web. Based on the captured click stream information, server 502 determines the items or categories of items which the user is interested in. Server 502 then sends promotion, at 214, or targeted advertisements related to the user interested items or categories of items in an active channel to portable device 520. The targeted advertisements are preferably displayed in promotion region 102 of screen 100 in FIG. 1. The promotion may be from the same vendor whose catalog the user is browsing, or other vendors in the user's downloaded list, or other vendors not in the list nor preprogrammed in portable device 520.

Figure 3:
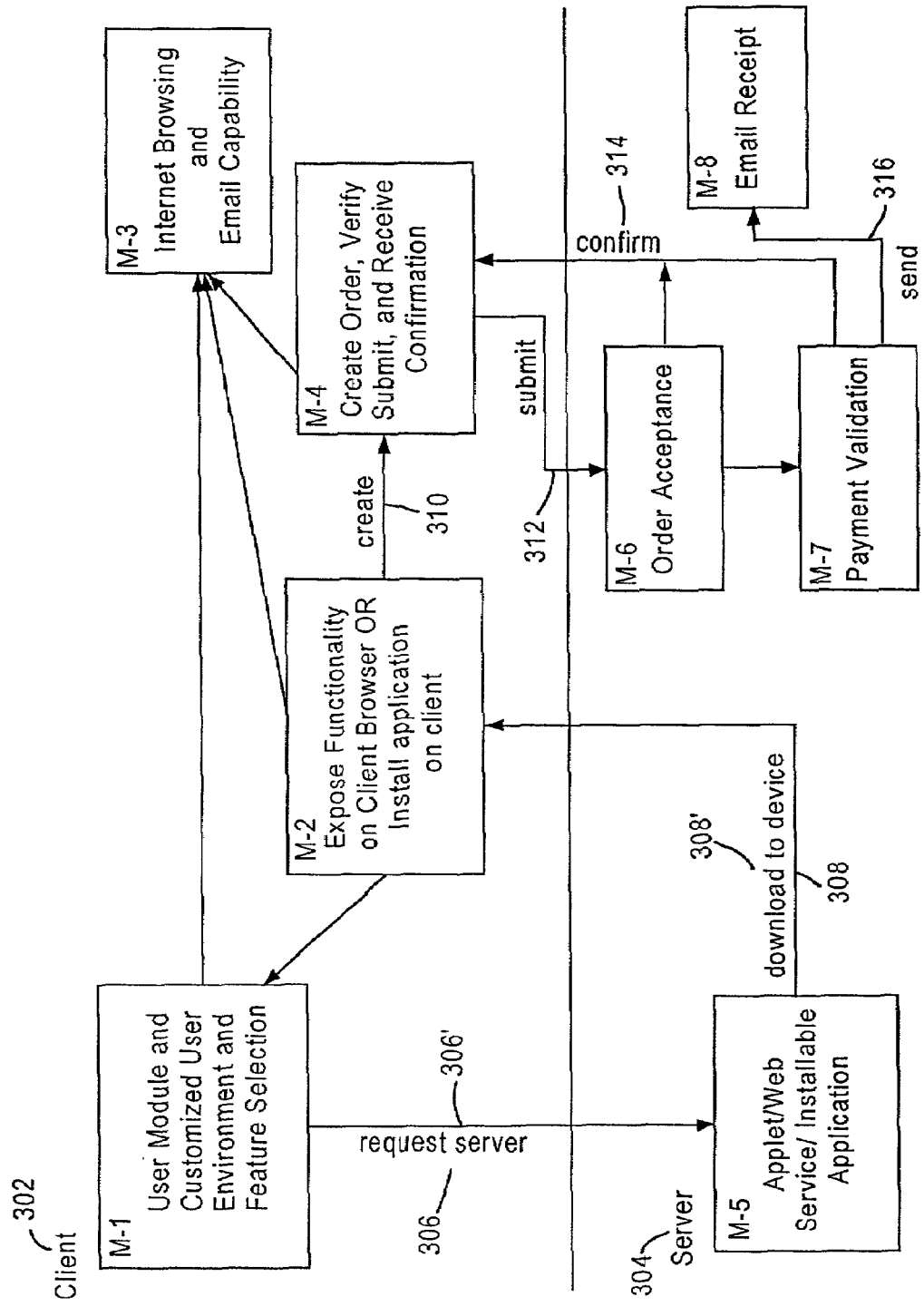
FIG. 3 is a block diagram showing logical architecture of a system in accordance with the present invention.

Reference is now made to FIG. 3 in which a block diagram showing logical architecture of a system in accordance with the present invention is presented. The logical architecture includes two parts, client application 302 preferably resided in portable device 520, and server application 304 preferably resided in server 502. Client application 302 comprises user module M1, functionality module M2, internet/email capability module M3, and shopping module M4. Server application 304 comprises application module M5, and order processing modules M6, M7, and M8.

Initially, if client application 302 has not been presented in portable device 520, portable device 520 initiates a connection with application module M5 of server application 304 by sending server request 306. Advantageously, server request 306 contains therein information related to a type of portable device 520 or its display or other capabilities which may be significant for properly presenting further information to the user of portable device 520. Upon receiving server request 306, application module M5 of server application 304 selects a package suitable for the particular device type and/or display type and/or other related capabilities of portable device 520, and sends the package to portable device 520, as illustrated at 308. The downloaded package includes therein client application 302 in form of an executable code, web service or installable application. Examples of such executable codes, web services and installable applications have been discussed before and include but not limited to Java applets, ActiveX controls, Win32 applications etc.

Once client application 302 has been properly installed or executed in portable device 520, functionality module M2 displays to the user a list of preprogrammed or user selected vendors which was embedded in the initial package downloaded from application module M5. The user then chooses a vendor from the list and another request 306' is formed, this time asking for a catalog of items offered by the selected vendor. Upon receiving request 306', application module M5 selects/generates the requested catalog in proper form to be presented on portable device 520, based on the specific type of portable device 520 or its display or other capabilities. Another package 308' containing the catalog information corresponding to the selected vendor is sent to functionality module M2. Advantageously, package 308' is selected taking into account the version of client application 302 installed in portable device 520, if it is the case.

Preferably, package 308' downloaded from application module M5 of server application 304 includes an executable code or trimmed web page. When package 308' is executed or displayed in a browser of portable device 520, it causes functionality module M2 of client application 302 to expose the functionality embedded in package 308' to the user. The user is then allowed to browse a list of items offered by the specific vendor. The user can also use the functionality exposed by functionality module M2 to create, at 310, an order in shopping module M4. Advantageously, at any point, the user can use Internet/Email capability module M3 to browse the internet and/or checking/composing emails.

The order is sent from shopping module M4 to order acceptance module M6 at 312. Order acceptance module M6 verifies/accepts the order. The verified and accepted order is then proceeded to payment validation module M7 which verifies if the payment is valid and if so accepts the payment. Payment validation module M7 also sends a confirmation message 314 back to shopping module M4 notifying the user of portable device 520 of order acceptance and order status. A digital receipt is also sent to email receipt module M8 at 316.

It should now be apparent that a method and apparatus of the invention have been described. It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. For example, package 306' may be directly sent to the selected vendor's web site rather than to server 502 as shown in FIG. 3. It is also within the scope of the present invention to arrange modules M6-M8 in the selected vendor's web site instead of server 502. Further modification may be made to configure user module M1 to verify an identity of the user upon logging portable device 520 or client application 302, and to customize a user environment for presenting featured options to the user based on previously entered user preferences. The present invention can also be implemented on tablet computer. It is, therefore, intended that the protection granted hereon be limited only by the definition contained in the appended claims and equivalents thereof.

What is claimed is:

1. A portable device for use in online retailing, comprising:
    a processor;
    a wireless port coupled to the processor for wireless connection to a server; a display component coupled to the processor;
    an input component coupled to the processor; and
    a memory coupled to the processor, the memory having stored therein sequences of instructions, which, when executed by the processor, cause the processor to perform the steps of:
    establishing a wireless connection between the portable device and the server via the wireless port;
    sending a request containing an indication of a type of the portable device from the portable device to the dedicated server;
    receiving a plurality of items corresponding to the type of the portable device from the dedicated server;
    presenting the received items on the display component for selection by a user of the portable device; and
    placing an order with the server based on at least one of the items selected by the user using the input component.

2. The portable device of claim 1, wherein the display component is a liquid crystal display screen, and the input component is a key pad.

3. The portable device of claim 1, wherein the display component and the input component are integrated in a touch screen.

4. The portable device of claim 1, wherein the type of the portable device comprises at least one of Internet-ready mobile phone and wireless-capable personal digital assistant and tablet computer.

5. The portable device of claim 1, wherein the display component has at least one of a screen size, a screen maximum resolution, and a screen color depth lower than a predetermined standard.

6. The portable device of claim 3, wherein the input component comprises a set of virtual navigational buttons displayed on a navigational region of the touch screen.

7. The portable device of claim 6, wherein the touch screen further comprises a main region for displaying the items and a promotional region for displaying promotional information received from the server.

8. The portable device of claim 1, wherein the sequences of instructions, when executed by the processor, further cause the processor to perform the step of monitoring the input component to capture click stream information provided by the user while browsing the items.

9. The portable device of claim 8, wherein the sequences of instructions, when executed by the processor, further cause the processor to perform the step of receiving and displaying promotional information tied to the captured information from the server.

10. The portable device of claim 1, wherein the memory comprises a plurality of non-volatile erasable programmable memory cells which are configured to be substantially instantly accessible by the processor upon power on of the portable device.

11. The portable device of claim 1, wherein the memory further stores therein at least one of a light weight browser and a email program.

12. The portable device of claim 1, wherein the memory further stores therein preprogrammed credit card information to be substantially instantly accessible by the user every time the user goes shopping online using the portable device.

13. The portable device of claim 12, wherein the memory further stores therein preprogrammed user preferences.

14. The portable device of claim 13, wherein the memory further stores therein an authentication piece of software for verifying an identity of the user, and an encryption software for encrypting the request and order.

* * * * *